United States Patent [19]

Campbell et al.

[11] 4,035,467

[45] July 12, 1977

[54] METHOD OF INJECTION MOLDING A THERMOSET POLYURETHANE ARTICLE

[75] Inventors: Gregory A. Campbell, Romeo; Howard W. Cox; William C. Meluch, both of Birmingham, all of Mich.

[73] Assignee: General Motors Corporation, Detroit, Mich.

[21] Appl. No.: 634,167

[22] Filed: Nov. 21, 1975

[51] Int. Cl.$^2$ .......................................... B29G 3/00
[52] U.S. Cl. .................... 264/329; 260/77.5 AP; 260/77.5 AT; 260/77.5 AA; 260/453 AR; 264/331; 264/349; 264/DIG. 77
[58] Field of Search ...... 264/328, 329, 331, 176 R, 264/DIG. 46, 77, 349; 260/77.5 AP, 77.5 AT, 77.5 AA, 453 AR; 156/125

[56] References Cited

U.S. PATENT DOCUMENTS

| | | | |
|---|---|---|---|
| 2,757,184 | 7/1956 | Pelley | 260/77.5 AT |
| 2,757,185 | 7/1956 | Barthel | 260/453 AR |
| 2,818,404 | 12/1957 | Hill | 260/77.5 AP |
| 2,902,474 | 9/1959 | Arnold et al. | 260/453 AR |
| 3,409,461 | 11/1968 | Mehlo et al. | 260/77.5 AA |
| 3,427,639 | 2/1969 | Strauss | 264/329 |
| 3,458,373 | 7/1969 | Knipp et al. | 156/125 |
| 3,917,792 | 11/1975 | Conacher, Jr. | 264/328 |
| 3,939,222 | 2/1976 | Dieterich | 264/331 |

FOREIGN PATENT DOCUMENTS

| | | | |
|---|---|---|---|
| 678,250 | 1/1964 | Canada | 264/329 |

*Primary Examiner*—Jeffery R. Thurlow
*Attorney, Agent, or Firm*—Jack I. Pulley

[57] ABSTRACT

In accordance with a preferred embodiment of this invention, a controlled phase change is used to trigger an exothermic polymerization reaction in an injection molding process. The subject method comprises first, dispersing a crystalline urea reactant, 1,3-bis-(3-isocyanatotolyl) urea, in a liquid polyoxyalkylene polyol or mixtures thereof. Since the polyols do not dissolve the urea at room temperature, the dispersion is storage stable over an extended period of time. This is unexpected because the isocyanate and hydroxyl functionalities are normally quite reactive. In the barrel of the injection molding machine, the dispersion is heated to a temperature at which the polyol will begin to dissolve and thereby react with the crystalline urea to initiate a controllable polyurethane-forming reaction. At present, the specific urea disclosed above is preferred because of its ability to (1) form a storage stable dispersion, (2) dissolve in the polyol at a temperature below its decomposition temperature, and (3) react with the polyol at controllable rates once it has dissolved. All three properties are important to this invention and they enable the practitioner to use conventional injection molding equipment.

2 Claims, No Drawings

METHOD OF INJECTION MOLDING A THERMOSET POLYURETHANE ARTICLE

This invention relates to a method of injection molding polyurethane articles using a storage-stable dispersion.

The stiffness of polyurethane resins may be significantly increased by incorporating a urea linkage into the polymer matrix. Typically, this has been accomplished by either adding water or a diamine to a polymerizing mixture of an isocyanate and a polyol; however, neither of these techniques are readily adaptable to an injection molding process. If water is added, carbon dioxide will be released and this unavoidably produces a cellular foam structure, and if a diamine is used, the rate of polymerization is greatly accelerated and the reaction becomes impossible to control in conventional molding equipment.

Ideally, to injection mold a thermosetting resin in conventional equipment, the starting material should be a storage stable, one component composition. During the injection molding process, the material should begin to polymerize as it is heated in the barrel of the machine; and once the material is injected into a heated mold, the polymerization reaction should quickly run to completion. However, in this mode of operation there is a danger that the temperature will get out of control and the polymerizing mixture will gel or set-up in the barrel or nozzle of the machine. If this occurs, the machine must be disassembled and cleaned. This problem is compounded in a polyurethane system because the polymerization reaction is exothermic and the rate of polymerization has a positive temperature coefficient, these two factors tend to make the reaction autocatalytic and difficult to control.

The basic problem of molding a thermosetting polyurethane article under controlled conditions and at reasonable rates has been approached in many ways but never satisfactorily resolved. Examples of these various techniques include: the use of partially polymerized prepolymers, the high energy impingement mixing of two or three ingredients just before the injection step, and encapsulation techniques. Each of these methods are costly; the prepolymer and the encapsulation techniques require additional steps in preparing the ingredients and the impingement mixing technique requires elaborate equipment. The subject method avoids these problems and provides a process which approaches the ideal.

It is an object of this invention to provide an economically attractive method of injection molding a thermosetting polyurethane article in conventional equipment and the article produced thereby. This method employs a room temperature storage stable dispersion of an isocyanate containing compound and a hydroxyl containing compound. This dispersion begins to polymerize as it is heated in the barrel of a conventional injection molding machine and to form a crosslinked urea containing polyurethane resin. In addition, the rate of reaction is controllable and yet proceeds at a reasonable rate once the mixture has been injected into a heated mold. The isocyanate compound used herein is a crystalline bis(isocyanatoaryl) urea.

These and other objects are accomplished in accordance with a preferred embodiment of this invention by first dispersing, a crystalline bis(isocyanatoaryl) urea, 1,3-bis-(3-isocyanatotolyl) urea, in a liquid mixture of polyoxyalkylene triols and diols. Typically, the isocyanate and hydroxyl functionalities react to form a urethane linkage; however, at room temperature this storage stable dispersion has a shelf life of up to a month, because the urea is insoluble in the polyols. However, when the temperature of the dispersion is raised to about 140° C., if the system is not catalyzed, or about 70° C. if a typical catalyst is used, the urea will begin to dissolve in the polyol, thereby forming a polymerizing mixture.

It is to be emphasized that at room temperature the urea is substantially insoluble in the polyol and there is essentially no polymerization occurring in this dispersed state even in the presence of a typical catalyst for the polyurethane forming reaction. As a result, this dispersion may be stored for an extended period of time. This advantage along greatly facilitates material handling problems which have proved very expensive and cumbersome in traditional thermosetting polyurethane molding operations which use a multi-component feedstock.

In the next step of the subject process, the dispersion is fed into an injection molding machine and is carried through the barrel and then injected into the mold. The barrel is heated to a temperature in the range of from about 60° C. to about 80° C. At this temperature the subject urea will begin to dissolve in the polyol and react in a controllable manner. Once in the mold which is heated to about 150° C., the polymerization reaction quickly runs to completion forming the thermoset article.

As is evident from the above description, the subject invention depends on a temperature controlled phase change, that is a dissolution, to trigger the exothermic polyurethane forming reaction. The use of this technique to initiate the reaction is made possible by the selection of a crystalline monomeric urea as the dispersible reactive solid, and the polyoxyalkylene polyols as the dispersing medium.

One group of di(isocyanatoaryl) urea compounds suitable in the subject invention is the isomers of 1,3-bis-(3-isocyanatotolyl) urea. These materials are the monomeric reaction product of 2,4 and/or 2,6 toluene diisocyanate and water. It is to be emphasized that only the monomeric form of these compounds have the proper solubility characteristics in liquid polyoxyalkylene polyols for the subject invention. Other polyfunctional (isocyanatoaryl) urea compounds having these characteristics would also be suitable.

The solubility properties which make the subject urea compound suitable for the subject injection molding process are: first, the urea is substantially insoluble in the polyoxyalkylene polyols at room temperature and thereby is able to form a room temperature, storage stable dispersion in which there is essentially no polymerization even at the interfacial surfaces. The desired stability is maintained even in the presence of organometallic compounds typically used to catalyze polyurethane forming polymerization reactions. Secondly, the subject urea will dissolve in the polyol mixture at a temperature of from about 60° C. to 80° C., if a catalyst is present; and once dissolved, the subject monomer will react in a controllable manner with the polyols to form a crosslinked, urea-containing polyurethane matrix. Typically, isocyanatoaryl urea compounds which are insoluble in polyols at room temperature remain insoluble at any elevated temperature which is below their thermal decomposition temperature. Finally, since, in the presence of a catalyst, the subject urea dissolves in the polyols at a relatively low temperature, the rate of subsequent polymerization reaction is relatively slow and can be controlled in the barrel of conventional injection molding machines. As the dissolution temperature increases so does the reaction rate and the reaction becomes more difficult to control.

The preferred monomeric urea compound, 1,3-bis-(4-isocyanatotolyl) urea, and prior art methods for preparing and using it are discussed in the following U.S. Pat. Nos. 2,757,184, 2,757,185 and 2,818,404.

This invention provides the practitioner with two significant advantages over prior art methods of injection molding stiff polyurethane articles. First, it permits him to prepare and store at room temperature a one package stable dispersion. This eliminates the inventory problems created by the use of multicomponent systems and problems associated with a special storage environment. Secondly, this development allows the practitioner to use conventional injection molding equipment to produce a relatively stiff thermosetting polyurethane article. Thus, equipment which may have been used in the past to injection mold a variety of thermoplastic or thermoset resins may now be readily used to injection mold thermoset polyurethane resins. Conventional equipment suitable for use with the subject method have been described in the *Modern Plastics Encyclopedia* and other standard texts.

This invention is a significant improvement over the prior art methods which employ expensive high energy impingement mixing machinery which has been used in a process for injection molding polyurethane resins which has been termed liquid injection molding (LIM) or reactive injection molding (RIM). In that system the two reactive components are stored separately and fed to the machine through two separate channels and then mixed under high impingement conditions just before they are pumped into the mold.

In accordance with the practice of this invention, one equivalent of the subject urea is dispersed in one equivalent of a polyol mixture which may range from 100 percent diol to 100 percent triol depending on whatever physical properties of the final product are desired by the practitioner. Either polyester or polyether polyols may be used and the hydroxyl functionalities at the end of the polyol chain may be in either a primary (attached to the alpha carbon atom) or a secondary (attached to the beta carbon atom) position. Preferably, the molecular weight (Mw) of the diol may vary from about 200 to about 2,000 and that of the triol may vary from about 1,000 to about 6,500. However, in general, the polyol type or structure does not significantly influence the operability of the subject invention and should be chosen within the context of the desired properties of the final product.

In the injection molding process, the barrel temperature may vary from about room temperature to about 70° C. or more depending on the catalyst type and concentration used and the flow rate of the dispersion through the barrel. With no catalyst, the dispersion containing the preferred urea is relatively stable up to about 140° C.; however, with about 0.1 percent by weight, based on the dispersion, of an organometallic coordination catalyst, such as those typically used to catalyze polyurethane forming polymerization reactions, the dispersion begins to react at about 60° C. to 70° C. The preferred barrel temperature is therefore controlled to provide a dispersion temperature within this range if a catalyst is used.

In a conventional injection molding machine, the dispersion is carried through the heated barrel by the action of the turning screw. In a single barrel machine, the reacting dispersion is accumulated in a region of the barrel just behind the nozzle. Then, this accumulated resin is injected into a mold cavity having the shape of the desired article.

Preferably, the mold is substantially hotter than the dispersion, as it leaves the barrel, because the additional heat accelerates the polymerization reaction and quickly drives it to completion. Mold temperatures as high as 150° C. or more are suitable. The hot mold condition promotes a minimum cycle time, which is the period extending from a given point, such as that instant at which the mold closes, in the production of one part to the same point in time during the production of the next part. In this process the cycle time will depend on, among other factors, the time necessary to polymerize the dispersion. In turn, the polymerization time is directly dependent upon the temperature of dispersion. Therefore, the shortest cycle time will be obtained when the dispersion is heated quickly and to a relatively high temperature, both in the barrel and in the mold. However, if the dispersion gets too hot in the barrel, the polymerization will go too far and the dispersion will set up in the barrel. This requires a time consuming cleaning operation. This problem is present in all methods of thermoforming thermoset resins, and is aggravated by the autocatalytic nature of this particular reaction. In the past this problem has precluded the use of conventional equipment. However, the subject process provides the practitioner with a polymerization reaction that he can control in ordinary single or double barrel injection molding machines and obtain a reasonable cycle time.

The cycle time is preferably within the range of from 100 to 115 seconds since this is sufficient to allow the polyurethane article to adequately cure without excessive shrinkage. However, the cycle time may be varied by controlling the barrel and mold temperatures and the catalyst concentration over a suitable range of from 60 to 300 seconds. In general, the subject injection molding process will operate within the general parameters of typical processes of injection molding thermosetting resins. Therefore, one skilled in this art will be able to adjust his equipment to most effectively use the subject process once he has read this disclosure.

The practitioner may also use the subject dispersion with the barrel held at room temperature; however, in this configuration the reaction will occur entirely in the mold and therefore the cycle time will be appreciably longer. In either configuration it may be necessary for the practitioner to cool the nozzle area of the injection molding machine to prevent the reaction from proceeding to the gel point and thereby setting up in the nozzle. The nozzle area has proved susceptible to this problem because it is metal and in direct thermally conductive contact with the heated mold and therefore tends to become overheated. The operability of the subject method is illustrated in the experiment and the examples described below.

To demonstrate the stability of the subject dispersion and that upon heating the ingredients would polymerize, the preferred urea was uniformly dispersed in a polyoxyalkylene triol and stored and then heated. More specifically, 111 grams of the polyol (Niax 11-34 which is a non-filled polyether triol having a molecular weight (Mw) of about 5,100 and which is made by Union Carbide) and 13.6 grams of 1,3-bis-(3-isocyanatotolyl) urea (Hylene TU made by Du Pont) were thoroughly mixed in a 150 milliliter beaker and allowed to remain at room temperature for over 90 hours. No appreciable polymerization could be observed. This dispersion was then heated to 150° C. and allowed to react for 10 minutes; the dispersion was stirred continuously during this reaction. After being poured into a mold, the material was cured in an oven at 180° C. for 20 minutes. A thermoset polyurethane article was then removed from the mold. This technique provides one method of quickly testing other polyfunctional isocyanatoaryl urea compounds to determine if they are suitable for the subject process. If a urea compound forms a room temperature storage stable dispersion in a polyoxyalkylene polyol-catalyst solution, and the dispersion begins to polymerize when heated to a point below the decomposition temperature of the urea compound, then the compound is probably suitable for the subject process.

It is believed that the average size of the urea particles may suitably vary from about 50 to about 750 microns and still pass the test described above. If the particle size is much smaller the surface reactions may become significant, due to the larger exposed surface area. This could prevent the formation of a storage stable dispersion. On the other hand, if the particle size is much larger, then additional mixing will be required during the reaction to maintain substantial homogeneity on a microscopic scale and maintain a uniform product.

EXAMPLE I

In this example flexural modulus testing bars (⅛ × 1 × 8 inches) were molded in accordance with the subject invention on a New Britain Model 75 injection molding machine, which was equipped with a thermoset-type constant flight depth screw having a nominal diameter of 1½ inches. The feed stock for this machine was a dispersion of about 33.3 parts by weight of 1,3-bis-(3-isocyanatotolyl) urea in 61.7 parts by weight of Niax 34–28 which is a polyoxypropylene triol with a molecular weight (Mw) of about 6,000 which has been filled with about 21 percent by weight of SAN; and 5.0 parts by weight of ethylene glycol. Stannous octoate, a conventional catalyst for the polymerization of polyols and isocyanates, was uniformly dispersed throughout the polyol urea mixture at a concentration of about 0.1 percent by weight.

The barrel was not heated and remained near room temperature; the mold was held at about 300° F. The injection pressure was from about 3,000 to about 4,000 psi and the mold pressure was about 2,000 psi. The total cycle time was about 2.5 minutes; and the physical properties of the molded bars were (1) a hardness of 35 on the Shore D scale, (2) a flexural modulus of 75.2 mega pascals (hereinafter MPa), (3) a tensile strength of 8.5 MPa and (4) a maximum elongation of 145 percent.

EXAMPLE II

Using the injection molding machine, the mold, and essentially the same formulation described in Example I, an additional set of runs were made to demonstrate the operability of the process with a heated barrel. The temperature gradient along the barrel was: feed zone 20° C., 2nd zone 50° C., 3rd zone 80° C., and nozzle 20° C. Other molding conditions were: mold temperature from about 130° C. to about 180° C.; inject plus hold time from about 60 to about 90 sec.; cure time from about 75 to about 180 sec. This set of runs demonstrated that it is possible to control a polymerizing dispersion of the subject ingredients in conventional injection molding equipment. The articles molded during this set of runs at a mold temperature of 150° C. had, on the average, the following physical properties: the hardness on the Shore D scale was 42; the tensile strength was 11.3 MPa; the elongation was 270 percent and the flex modulus was 55.9 MPa. It is believed that the difference between the physical properties reported in this example and those of Example I, is the result of contamination of the urea compound used in Example I.

It is noted that for this particular machine set-up that the barrel volume was about 9.2 cubic inches and the shot volume was about 0.95 cubic inches. With these figures and a cycle time of about 3 minutes, the total residence time of the dispersion in the barrel was about 30 minutes. However, a specific volume of dispersion remained in the hottest zone, zone 3, for only about 7 minutes.

While our invention has been described in terms of certain preferred embodiments, it will be appreciated that other forms thereof could readily be adapted by one skilled in the art. Therefore, the scope of our invention is not to be limited to the specific embodiments disclosed.

What is claimed is:
1. A method of forming a cross-linked polyurethane article in an injection molding machine comprising the steps of:
   a. forming a room temperature storage stable dispersion comprising a liquid polyoxyalkylene triol, 1,3-bis-(3-isocyanatotolyl) urea and a catalyst which urea at about room temperature is insoluble in and therefore non-reactive with the triol;
   b. feeding said dispersion into the barrel of the molding machine;
   c. simultaneously moving said dispersion through the barrel and heating the dispersion therealong to a temperature at which the urea dissolves in the triol and initiates a polyurethane forming polymerization reaction between the isocyanate functionalities on the urea and the hydroxyl functionalities on the triol;
   d. injecting the heated dispersion into the cavity of a mold to form the shape of said article; and
   e. maintaining the heated and reacting dispersion in the mold until reaction has at least reached that point at which the article is substantially self-sustaining.

2. A method of molding a crosslinked polyurethane article in an injection molding machine comprising the steps of:
   a. forming a storage stable dispersion comprising a polyfunctional isocyanatoaryl urea, a liquid polyoxyalkylene triol, and a catalyst, which urea at about room temperature is insoluble in and thereby nonreactive with the triol and which urea is soluble in and thereby will polymerize with said triol to form a polyurethane at an elevated temperature which is below the thermal decomposition temperature of the urea;

b. feeding the dispersion into the barrel of the molding machine;
c. simultaneously moving the dispersion through the barrel and heating the dispersion therealong to a temperature at which the urea becomes soluble in the triol to initiate the polymerization reaction;
d. injecting said heated dispersion into the cavity of a heated mold to form the shape of the article; and
e. maintaining the heated and reacting dispersion in the mold until reaction has at least reached that point at which the article is substantially self-sustaining.

* * * * *

UNITED STATES PATENT OFFICE
CERTIFICATE OF CORRECTION

Patent No. 4,035,467   Dated   July 12, 1977

Inventor(s) Gregory A. Campbell et al.

It is certified that error appears in the above-identified patent and that said Letters Patent are hereby corrected as shown below:

Column 2, line 16, "along" should read -- alone --.

Column 5, line 2, "(Mw)" should read -- ($\bar{M}w$) --; line 45, "(Mw)" should read -- ($\bar{M}w$) --.

Column 3 should appear as shown on the attached sheet:

*Signed and Sealed this*

*Twenty-seventh* Day of *December 1977*

[SEAL]

Attest:

RUTH C. MASON
*Attesting Officer*

LUTRELLE F. PARKER
*Acting Commissioner of Patents and Trademarks* subject urea dissolves in the polyols at a relatively low temperature, the rate of subsequent polymerization reaction is relatively slow and can be controlled in the barrel of conventional injection molding machines. As the dissolution temperature increases so does the reaction rate and the reaction becomes more difficult to control.

The preferred monomeric urea compound, 1,3-bis-(3-isocyanatotolyl) urea, and prior art methods for preparing and using it are discussed in the following U.S. Pat. Nos. 2,757,184, 2,757,185 and 2,818,404.

This invention provides the practitioner with two significant advantages over prior art methods of injection molding stiff polyurethane articles. First, it permits him to prepare and store at room temperature a one package stable dispersion. This eliminates the inventory problems created by the use of multicomponent systems and problems associated with a special storage environment. Secondly, this development allows the practitioner to use conventional injection molding equipment to produce a relatively stiff thermosetting polyurethane article. Thus, equipment which may have been used in the past to injection mold a variety of thermoplastic or thermoset resins may now be readily used to injection mold thermoset polyurethane resins. Conventional equipment suitable for use with the subject method have been described in the *Modern Plastics Encyclopedia* and other standard texts.

This invention is a significant improvement over the prior art methods which employ expensive high energy impingement mixing machinery which has been used in a process for injection molding polyurethane resins which has been termed liquid injection molding (LIM) or reactive injection molding (RIM). In that system the two reactive components are stored separately and fed into the machine through two separate channels and then mixed under high impingement conditions just before they are pumped into the mold.

In accordance with the practice of this invention, one equivalent of the subject urea is dispersed in one equivalent of a polyol mixture which may range from 100 percent diol to 100 percent triol depending on whatever physical properties of the final product are desired by the practitioner. Either polyester or polyether polyols may be used and the hydroxyl functionalities at the end of the polyol chain may be in either a primary (attached to the alpha carbon atom) or a secondary (attached to the beta carbon atom) position. Preferably, the molecular weight (Mw) of the diol may vary from about 200 to about 2,000 and that of the triol may vary from about 1,000 to about 6,500. However, in general, the polyol type or structure does not significantly influence the operability of the subject invention and should be chosen within the context of the desired properties of the final product.

In the injection molding process, the barrel temperature may vary from about room temperature to about 100° C. or more depending on the catalyst type and concentration used and the flow rate of the dispersion through the barrel. With no catalyst, the dispersion containing the preferred urea is relatively stable up to about 140° C.; however, with about 0.1 percent by weight, based on the dispersion, of an organometallic coordination catalyst, such as those typically used to catalyze polyurethane forming polymerization reactions, the dispersion begins to react at about 60° C. to 80° C. The preferred barrel temperature is therefore